US012458892B1

(12) United States Patent
Byskal et al.

(10) Patent No.: US 12,458,892 B1
(45) Date of Patent: Nov. 4, 2025

(54) EVENT PROCESSING FOR GAME FEATURES ACROSS VARIED HOSTING TOPOLOGIES

(71) Applicant: Amazon Technologies, Inc., Seattle, WA (US)

(72) Inventors: Christopher Byskal, Redmond, WA (US); Christopher Lee, Bellevue, WA (US); Toufeeq Hussain, San Francisco, CA (US); Raymond H. Kelm, Snohomish, WA (US); Nick Roldan Delos Santos, Cerritos, CA (US); David G. Marsee, Renton, WA (US); Jeffery Blaine Petersen, San Diego, CA (US); Henry Liang Goffin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 328 days.

(21) Appl. No.: 18/067,063

(22) Filed: Dec. 16, 2022

(51) Int. Cl.
*A63F 13/77* (2014.01)
*A63F 13/60* (2014.01)
*G06F 9/54* (2006.01)

(52) U.S. Cl.
CPC .............. *A63F 13/77* (2014.09); *A63F 13/60* (2014.09); *G06F 9/542* (2013.01)

(58) Field of Classification Search
CPC .......... A63F 13/60; A63F 13/67; A63F 13/73; A63F 13/75; A63F 13/77; A63F 13/85; A63F 13/86; A63F 13/87; A63F 2300/40; A63F 2300/402; A63F 2300/404; A63F 2300/535; A63F 2300/537; A63F 2300/538; A63F 2300/55; A63F 2300/552; A63F 2300/5533; A63F 2300/556; A63F 2300/5586; A63F 2300/57; A63F 2300/572; A63F 2300/577
See application file for complete search history.

(56) References Cited

U.S. PATENT DOCUMENTS

2006/0048092 A1* 3/2006 Kirkley, Jr. ............ G06F 9/451 717/100
2011/0092279 A1* 4/2011 Pilip ...................... A63F 13/63 463/43
2011/0131509 A1* 6/2011 Brillhart ................ G06Q 30/02 715/757

(Continued)

*Primary Examiner* — Milap Shah
(74) *Attorney, Agent, or Firm* — BakerHostetler

(57) ABSTRACT

An event notification may be received, by a game feature integration service, from a first video game feature component. The game feature integration service may integrate a plurality of video game feature components that each have a respective set of one or more events for which event notifications are sent by a corresponding video game feature component to the game feature integration service and a respective set of one or more actions that are called on the corresponding video game feature component by the game feature integration service. A pre-configured or custom rule flow may trigger the game feature integration service to call an action on the second video game feature component based on the event notification. The game feature integration service, based at least in part on the rule flow, may call the action on the second video game feature component in response to the event notification.

17 Claims, 9 Drawing Sheets

(56) References Cited

U.S. PATENT DOCUMENTS

| | | | | |
|---|---|---|---|---|
| 2011/0136569 | A1* | 6/2011 | Gura | G07F 17/32 463/29 |
| 2011/0209117 | A1 | 8/2011 | Agustin et al. | |
| 2011/0281639 | A1* | 11/2011 | Porat | A63F 13/80 463/23 |
| 2013/0054353 | A1* | 2/2013 | Tabor | G06Q 30/0207 705/14.49 |
| 2013/0260867 | A1* | 10/2013 | Bronstein Bendayan | A63F 13/795 463/24 |
| 2014/0047413 | A1 | 2/2014 | Shieve et al. | |
| 2014/0087355 | A1* | 3/2014 | Henry | G09B 7/00 434/362 |
| 2019/0012734 | A1* | 1/2019 | Cruttenden | G06Q 20/36 |
| 2020/0353363 | A1* | 11/2020 | Slovak | A63F 13/355 |
| 2022/0143510 | A1 | 5/2022 | Lin | |
| 2022/0249957 | A1* | 8/2022 | Kaufman | G06N 20/00 |
| 2022/0269489 | A1* | 8/2022 | Roth | A63F 13/63 |
| 2022/0401843 | A1* | 12/2022 | Kennett | A63F 13/75 |
| 2023/0173395 | A1* | 6/2023 | Cella | G06Q 30/06 463/25 |

* cited by examiner

API Schema 300

- 301 - Bus Resource
    - 302 - Attachment Resource
        - 303 - CreateBusAttachment(busName, GFCId, config)
        - 304 - ListBusAttachments(busName)
        - 305 - DescribeBus(busName)
        - 306 - DeleteBusAttachment(busName, GFCId)
        - 307 - UpdateBusAttachment(busName, GFCId, config)
    - 308 - RuleFlow Resource
        - 309 - CreateRuleFlow
        - 310 - ListRuleFlows
        - 311 - DescribeRuleFlow
        - 312 - DeleteRuleFlow
        - 313 - UpdateRuleFlow
- 314 - GFC Resource
    - 315 - ListPrivateGFCs()
    - 316 - ListPubliclyAvailableGFCs()
    - 317 - CreateGFC(GFCId)
    - 318 - DeleteGFC(GFCId)
    - 319 - PutGFCEvent(GFCId, busName, event)
    - 320 - Action Resource
        - 321- CreateGFCAction(GFCid, actionName, config)
        - 322 - ListGFCActions(GFCId)
        - 323 - DeleteGFCAction(GFCid, actionName)
        - 324 - UpdateGFCAction(GFCid, actionName, config)
    - 325 - Event Resource
        - 326 - CreateGFCEvent(GFCId, eventName, config)
        - 327 - ListGFCEvents(GFCId)
        - 328 - DeleteGFCEvent(GFCid, actionName)
        - 329 - UpdateGFCEvent(GFCid, actionName, config)

FIG. 3

EVENT PROCESSING FOR GAME FEATURES ACROSS VARIED HOSTING TOPOLOGIES

CROSS-REFERENCE TO RELATED APPLICATIONS

This application is related to the following application, which is hereby incorporated by reference in its entirety: U.S. patent application Ser. No. 18/067,103 filed Dec. 16, 2022, entitled "INTEGRATION OF GAME FEATURES ACROSS VARIED HOSTING TOPOLOGIES". This application is also related to the following application, which is also hereby incorporated by reference in its entirety: U.S. patent application Ser. No. 18/067,079 filed Dec. 16, 2022, entitled "PRE-CONFIGURED RULE FLOWS FOR GAME FEATURE INTEGRATION".

BACKGROUND

Game developers building modern multiplayer games may need to include and assemble many backend video game features in the game, such as authentication, achievements, leaderboards, voice chat, text chat, matchmaking, game servers, in-game economies and so on. Some games may employ thirty or more of these backend features. Today, game developers typically construct hybrid game backends in order to include all of the features they need in their games. For example, game developers may create and host some of those features themselves, may use a given cloud service provider for other features and may use other third-parties for yet other features. To make this work, game developers may need to write a lot of integration code (sometimes referred to as "glue" code) to integrate these features together. In games, the output of one backend game feature typically feeds into another. For example, a player may first authenticate and, if successful, then go into matchmaking and then into game servers. This example may involve the use of three backend features to get a player into a game server. After completing this work, the game developer may be left with multiple backend video game features, typically supported by different hosting providers (e.g., on-premises or in the cloud), all communicating with one another through custom integration code the developer has created. Since integration is through writing custom code, it is not easy for developers to add or modify backend game components, as the components may not be designed to work with one another

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 3 is a diagram illustrating an example game feature integration service application programming interface (API) schema that may be used in accordance with the present disclosure.

DETAILED DESCRIPTION

Figure 1:
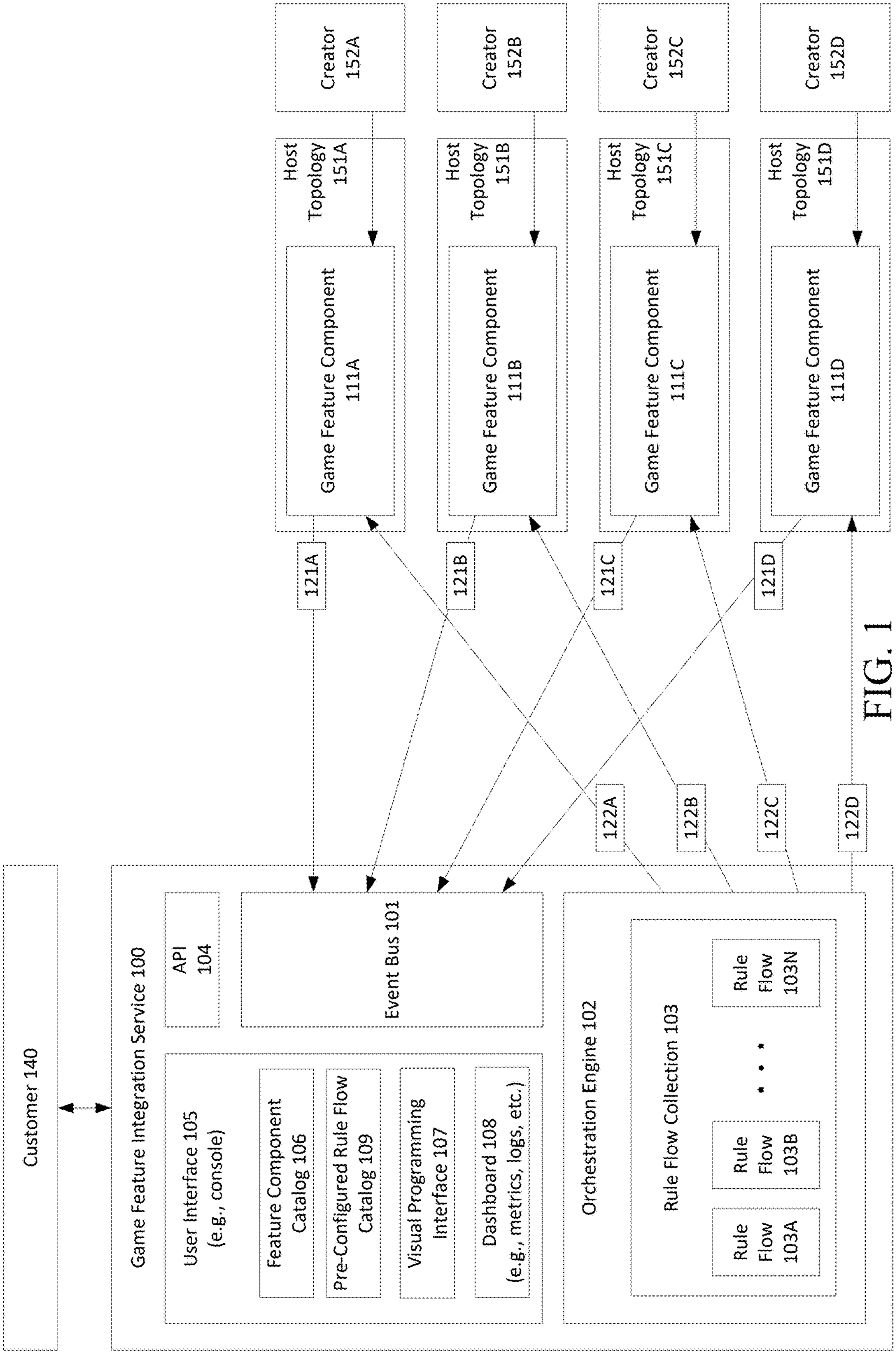
FIG. 1 is a diagram illustrating a first example game feature component integration system in that may be used in accordance with the present disclosure.

Techniques for integration of game features across varied hosting topologies are described herein. Specifically, a game feature integration service is described that may integrate a plurality of game feature components that are host-independent and creator-independent without the need for a game developer to create custom integration code (e.g., glue code). Each of the game feature components are components that perform one or more video game-related features, such as one or more backend video game features, for example including authentication, achievements, leaderboards, voice chat, text chat, matchmaking, game servers, in-game economies and so on. A game feature component is a software computing component that executes respective instructions for reporting respective defined events and performing respective defined actions that the game feature component may be called to perform. Additionally, a game feature component may define data that specifies structure and validation techniques for inputs to, and outputs from, the respective defined actions. The term host-independent, as used herein, refers to game feature components that may be integrated by the game feature integration service irrespective of the host topologies that are used to host the game feature components. This means that the game feature integration service may integrate game feature components hosted on any number of different host topologies. In one specific example, the game feature integration service may integrate a first game feature component hosted by a developer's personal computer (e.g., laptop, desktop etc.), a second game feature component hosted by a customer's on-premises data center, a third game feature component hosted by a first cloud service provider, and a fourth game feature component hosted by a second cloud service provider. The term creator-independent, as used herein, refers to game feature components that may be integrated by the game feature integration service irrespective of the creators of the game feature components. This means that the game feature integration service may integrate game feature components created by any number of different creators. In one specific example, the game feature integration service may integrate a first game feature component created by a customer of the game feature integration service, a second game feature component created by a first cloud service provider, and a third game feature component created by a second cloud service provider and a fourth game feature component created by another third-party developer.

The game feature integration service may provide an event bus and a corresponding orchestration engine that assist in integration of the game feature components. In some examples, the game feature integration service may provide at least one respective event bus and orchestration engine for each customer of the game feature integration service. The game feature integration service may also define an application programming interface (API), that allows customers to perform various operations, such as registering game feature components to a bus, defining events and actions for each game feature component, defining rule flows for processing events, and for performing many other operations. In some examples, customers may create their own custom game feature components and/or use other available game feature components created by other parties. The game feature integration service may optionally provide a catalog of available game feature components that may be selected for use by customers of the game feature integration service.

In some examples, a customer may register (e.g., attach) a plurality of game feature components to an event bus, for example via the game feature integration service API. Each game feature component may have a respective set of events and a respective set of actions. The respective events may be events for which a corresponding game feature component may provide event notifications to the game feature integration service (via the event bus to which the corresponding game feature component is registered). The respective actions may be actions that are called on the corresponding game feature component by the game feature integration service. In some examples, the respective events and actions for each game feature component may also be defined via the game feature integration service API.

A customer may also create rule flows that specify how events are routed and processed by the game feature integration service. For example, a rule flow may specify one or more actions to be called on one or more game feature components based on a given event. In some examples, a rule flow may indicate that performance of one or more actions is conditional based on one or more parameters associated with the event. Also, in some examples, a rule flow may chain actions together, for example so that the output of one game feature component is picked up and processed by one or more other game feature components. In some examples, the game feature integration service may provide a visual programming interface that allows customers to visually define a rule flow, such as by manipulating graphical representations of operations such as matching of events, calling of actions, and corresponding inputs and outputs. In some cases, the game feature integration service may then generate an underlying data representation (e.g., via JavaScript Object Notation (JSON)) of the rule flow based on the graphical relationships defined by the customer within the visual programming interface.

In addition to creating rule flows, a customer may also select pre-configured rule flows for use by the customer, such as from a catalog of pre-configured rule flows that may be provided by the game feature integration service. A pre-configured rule flow, as that term is used herein, refers to a rule flow that is configured (or at least partially configured) prior to being selected and used by a customer, including rule flows created by the game feature integration service and/or other third parties. A pre-configured rule flow may have a plurality of related game feature components for which the pre-configured rule flow is designed, or otherwise configured, to facilitate interactions. Specifically, a pre-configured rule flow may include rules for processing event notifications received from related game feature components. For example, a pre-configured rule flow may include rules for triggering an action call to a related game feature component based on an event notification from another related game feature component. In some examples, as a convenience to the customer, when a customer selects a pre-configured rule flow, any, or all, of the related game feature components that are related to the pre-configured rule flow may be automatically attached to the event bus without the need for specific attachment instructions from the customer. Also, in some examples, the related game feature components for a pre-configured rule flow may be indicated to the customer (e.g., via the catalog of pre-configured rule flows), and the customer may select which of the related game feature components the customer wishes to attach to the event bus. For example, in some cases, a customer may choose from multiple alternative related game feature components that may be used with the pre-configured rule flow—or the customer may instead choose to substitute their own custom-made game feature component (or another third-party game feature component) for one or more of the related game feature components.

In some examples, when an event notification is received by an event bus, the orchestration engine may evaluate a collection of defined rule flows to determine one or more of the available rule flows that are applicable to the event. The orchestration engine may then select a given applicable rule flow and perform one or more actions indicated by the rule flow. For example, an event notification may be provided by a first game feature component, and the applicable rule flow may indicate one or more actions to be performed on one or more other game feature components based on the event, and optionally based on one or more parameters associated with the event.

FIG. 1 is a diagram illustrating a first example game feature component integration system in that may be used in accordance with the present disclosure. As shown in FIG. 1, a game feature integration service 100 integrates game feature components 111A-D that are host-independent and creator-independent. Each of the game feature components 111A-D are components that perform one or more video game-related features, such as one or more backend video game features, for example including authentication, achievements, leaderboards, voice chat, text chat, matchmaking, game servers, in-game economies and so on. A game feature component 111A-D is a software computing component that executes respective instructions for reporting respective defined events and performing respective defined actions that the game feature component 111A-D may be called to perform. Additionally, a game feature component 111A-D may define data that specifies structure and validation techniques for inputs to, and outputs from, the respective defined actions. As described above, the term host-independent, as used herein, refers to game feature components 111A-D that may be integrated by the game feature integration service 100 irrespective of the host topologies 151A-D that are used to host the game feature components 111A-D. This means that the game feature integration service 100 may integrate game feature components 111A-D hosted on any number of different host topologies 151A-D. In the example of FIG. 1, game feature component 111A is hosted by host topology 151A, which may be, for example, a developer's personal computer (e.g., laptop, desktop etc.). Game feature component 111B is hosted by host topology 151B, which may be, for example, a customer's on-premises data center. Game feature component 111C is hosted by host topology 151C, which may be, for example, a first cloud service provider. Game feature component 111D is hosted by host topology 151D, which may be, for example, a second cloud service provider. As also described above, the term creator-independent, as used herein, refers to game feature components 111A-D that may be integrated by the game feature integration service 100 irrespective of the creators of the game feature components 111A-D. This means that the game feature integration service 100 may integrate game feature components 111A-D created by any number of different creators 152A-D. In the example of FIG. 1, game feature component 111A is created by creator 152A, which may be, for example, a customer of the game feature integration service 100. Game feature component 111B is created by creator 152B, which may be, for example, a third-party developer. Game feature component 111C is created by creator 152C, which may be, for example, a first cloud service provider. Game feature component 111D is created by creator 152D, which may be, for example, a second cloud service provider.

As shown in FIG. 1, the game feature integration service 100 may provide an event bus 101 and an orchestration engine 102 that assist in integration of the game feature components 111A-D. In the example of FIG. 1, the event bus 101 and the orchestration engine 102 are operated on behalf of customer 140. The game feature integration service 100 may also operate any number of other event buses and orchestration engines on behalf of customer 140 and/or other customers. The game feature integration service 100 may also define an API 104, that allows customer 140 to perform various operations, such as registering game feature components 111A-D to event bus 101, defining events and actions for game feature components 111A-D, defining rule flows 103A-N for processing events, and many other operations. In some examples, customer 140 may create its own custom game feature components and/or use other available game feature components created by other parties. The game feature integration service 100 may provide a feature component catalog 106, which may include browsable listings of available game feature components for selection by the customer 140.

Each game feature component 111A-D may have a respective set of events and a respective set of actions. In the example of FIG. 1, game feature components 111A-D send event notifications 121A-D, respectively. The event notifications 121A-D are notifications of game-related events. The event notifications 121A-D are received by the game feature integration service 100 via the event bus 101. As also shown in FIG. 1, action calls 122A-D are performed by game feature integration service 100 on game feature components 111A-D, respectively. Some examples of events and actions are described in detail below with reference to FIG. 2.

In the example of FIG. 1, customer 140 creates and/or selects rule flows 103A-N that specify how events are routed and processed by the game feature integration service. For example, a rule flow 103A-N may specify one or more actions to be called on one or more of game feature components 111A-D based on a given event. In some examples, a rule flow 103A-N may indicate that performance of one or more actions is conditional based on one or more parameters associated with the event. Also, in some examples, a rule flow 103A-N may chain actions together, for example so that the output of one of game feature components 111A-D is picked up and processed by one or more other game feature components 111A-D. The rule flows 103A-N may include, for example, custom rule flows created by the customer 140 as well as pre-configured rule flows generated (or at least partially generated) by other parties (e.g., the game feature integration service 100 and/or other third parties).

As shown in FIG. 1, the game feature integration service 100 may provide a user interface 105, such as a console interface, which may provide, for example, the feature component catalog 106, a pre-configured rule flow catalog 109, a visual programming interface 107, a dashboard 108 and other interface features. The visual programming interface 107 may allow users to visually define a rule flow 103A-N, such as by manipulating graphical indications representing operations such as matching of events, calling of actions, and corresponding inputs and outputs. In some cases, the game feature integration service 100 may then generate an underlying data representation (e.g., via JSON) of the rule flow 103A-N based on the graphical relationships defined by the customer within the visual programming interface 107. A specific example of the visual programming interface 107 is described in detail below with reference to FIG. 4.

In addition to creating custom rule flows (e.g., using visual programming interface 107 and/or other interfaces), the customer 140 may also select pre-configured rule flows for use by the customer 140. As shown in FIG. 1, the game feature integration service 100 may provide pre-configured rule flow catalog 109, which may indicate one or more pre-configured rule flows that are available for selection and use by the customer 140. A pre-configured rule flow, as that term is used herein, refers to a rule flow that is configured (or at least partially configured) prior to being selected and used by a customer 140, including rule flows created by the game feature integration service 100 and/or other third parties. A pre-configured rule flow may have a plurality of related game feature components for which the pre-configured rule flow is designed, or otherwise configured, to facilitate interactions. Specifically, a pre-configured rule flow may include rules for processing event notifications received from related game feature components. For example, a pre-configured rule flow may include rules for triggering an action call to a related game feature component based on an event notification from another related game feature component. In some examples, as a convenience to the customer 140, when the customer 140 selects a pre-configured rule flow, any, or all, of the related game feature components that are related to the pre-configured rule flow may be automatically attached to the event bus 101 without the need for specific attachment instructions from the customer 140. Additionally, in some examples, in addition to automatically registering the related video game feature components, the game feature integration service may also automatically import lists, or other indications, of defined actions and events for each of the related video game feature components. Also, in some examples, the related game feature components for a pre-configured rule flow may be indicated to the customer 140 (e.g., via the pre-configured rule flow catalog 109), and the customer 140 may select which of the related game feature components the customer 140 wishes to attach to the event bus 101. For example, in some cases, a customer 140 may choose from multiple alternative related game feature components that may be used with the pre-configured rule flow—or the customer 140 may instead choose to substitute their own custom-made game feature component (or another third-party game feature component) for one or more of the related game feature components.

The user interface 105 may also include a dashboard 108, which may provide reporting information related to each of game feature components 111A-D and event bus 101, such as latency and other performance metrics, logs and other reporting information. Developers may use this reporting information to visualize, test, and debug gameplay behavior. The dashboard 108 may provide a central console for monitoring and configuration, such as by providing performance metrics on each game feature component 111A-D, which may eliminate the need for custom backend dashboards to monitor live games. Thus, the game feature integration service 100 may provide a centralized reporting interface (e.g., dashboard 108) from which performance metrics for each of a plurality of video game feature components (e.g., game feature components 111A-D) are obtainable. To change how the game backend behaves, developers may simply update the rule flow configurations in the user interface 105 or through the API 104 to change how events are emitted or consumed by game feature components 111A-D connected to their event bus 101.

In some examples, when one of event notifications 121A-D is received by the event bus 101, the orchestration engine 102 may evaluate rule flow collection 103 to determine one or more of the rule flows 103A-N that are applicable to the corresponding event. The orchestration engine 102 may then determine one of or more of the rule flows 103A-N that are applicable and perform one or more of the action calls 122A-D that may be indicated by the one or more of the rule flows 103A-N. For example, game feature component 111A may provide a notification of a given event, and a rule flow 103A-N may indicate an action to be called on game feature component 111B based on the event, and optionally based on one or more parameters associated with the event.

Figure 2:
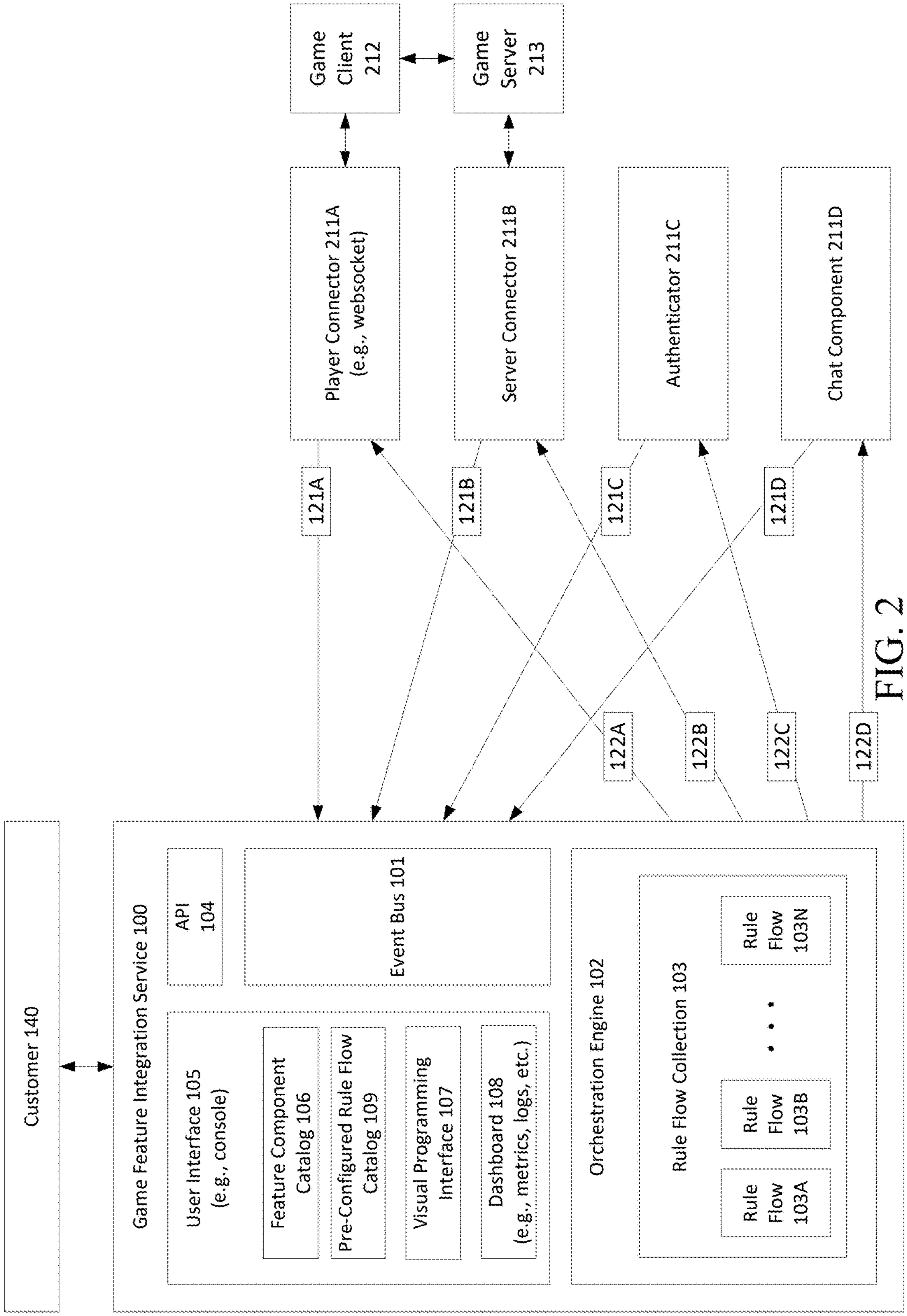
FIG. 2 is a diagram illustrating a second example game feature component integration system that may be used in accordance with the present disclosure.

Referring now to FIG. 2, some example flows of events and actions will now be described in detail. In the example of FIG. 2, the game feature components include a player connector 211A, a server connector 211B, an authenticator 211C and chat component 211D. The player connector 211A may provide a connection for game client 212. The server connector 211B may provide a connection for game server 213. The authenticator 211C may provide identity and authentication services. The chat component 211D may provide chat services. An example flow for authenticating a player will now be described in detail. In some examples, game client 212 may connect to a player connector 211A, which may be, for example, a websocket service. The connection of game client 212 to the player connector 211A may trigger the player connector 211A to send one of event notifications 121A to the event bus 101. This may indicate that the game client 212 has connected to the player connector 211A and may include a connection identifier (ID) corresponding to the connection. In order to trigger the authentication process, the game client 212 may send a log-in message, via the player connector 211A, that includes an authentication token for the connection. Another one of event notifications 121A may then be sent from the player connector 211A to the event bus 101 indicating a message received event for the corresponding connection ID with a message type=log-in. The orchestration engine 102 may then identify a rule flow 103A corresponding to a message received event notification. In this example, the rule flow 103A may include a rule that specifies that if a message received event notification has a message type=log-in, then an action will be triggered to route the message to the authenticator 211C and request that the authenticator 211C verify the token. The rule may specify that, if the token is valid, the authenticator 211C will return a player ID. The rule may further specify that, if the token is invalid, the authenticator 211C will return a message indicating that the token is invalid. Thus, if the token is valid, authenticator 211C may send one of event notifications 121C to the event bus 101 that returns a player ID. Another rule may then specify that, when a player ID is returned by the authenticator 211C, one of action calls 122A will be triggered on the player connector 211A to set the player ID that is associated with the corresponding connection ID (received previously from the player connector 211A) to the player ID that is received from the authenticator 211C. Another rule may then specify that, after setting the player ID for the connection, another one of action calls 122A will be triggered on the player connector 211A to indicate that the log-in for the corresponding connection ID (received previously from the player connector 211A) has been performed successfully. Many other types of event and action flows may also be implemented. For example, in some cases, when an event occurs corresponding to a new player connecting to a game, action calls 122D may be triggered on chat component 211D to post chat messages notifying each other player that the new player has joined the game.

Referring now to FIG. 3, an example of an API schema 300 for an API 104 of game feature integration service 100 will now be described in detail. In this example, API schema 300 includes lines 301-329. Line 301 specifies a bus resource, which may correspond to event bus 101. Line 301 indicates that the next indented tier of bullets (which includes lines 302 and 308) relate to resources that may be registered with the event bus 101. Line 302 indicates an attachment resource, which is a resource that may be attached to the event bus. In this example, the attachment resource is a game feature component (GFC). The game feature components are referred to as attachment resources because they may be registered with (e.g., attached to) the event bus 101. Registering (e.g., attaching) a game feature component with the event bus 101 allows the event bus 101 to receive event notifications from the game feature component and to issue action calls to the game feature component. Line 302 is heading that indicates that the next indented tier of bullets (which includes lines 303-309) specify API calls for the attachment resource. Specifically, line 303 specifies a CreateBusAttachment call that allows an attachment (game feature component) to be registered (e.g., attached) to the event bus 101. The CreateBusAttachment call has parameters busName, GFCId, and config. The busName is the name of the bus to which the game feature component is being attached. The GFCId is an identifier for the game feature component being attached. The config parameter (an abbreviation for the term configuration) represents configuration information regarding the game feature component that is associated with the event bus to which the game feature component is being attached. Line 304 specifies a ListBusAttachments call that will provide a list of game feature components that are attached to the event bus 101. Line 304 specifies a DescribeBus call that will describe the event bus 101. Line 305 specifies a DeleteBusAttachment call that will delete/detach an identified game feature component from the event bus 101. Line 306 specifies an UpdateBusAttachment call, which allows modification of configuration information (via the config parameter) for the identified game feature component attached to the event bus 101.

Line 308 is a heading that indicates that the next indented tier of bullets (which includes lines 309-313) specify API calls for a rule flow. Similar to game feature components, the rule flows may also be registered with the event bus 101. Registering of a rule flow with the event bus 101 allows the event bus 101 to implement the rule flow when the rule flow is applicable to a received event notification. Specifically, line 309 specifies a CreateRuleFlow call that allows a user to create a rule flow and register the rule flow with the event bus 101. Line 310 specifies a ListRuleFlows call that will list all rule flows that are registered with the event bus 101. Line 311 specifies a DescribeRuleFlow call that allows a specified rule flow to be described. Line 312 specifies a DeleteRuleFlow call that allows a specified rule flow to be deleted and deregistered from the event bus 101. Line 313 specifies an UpdateRuleFlow that allows a specified rule flow to be updated.

Line 314 is a heading that indicates that the following lines (lines 315-329) relate to game feature components. Line 315 specifies a ListPrivateGFCs call that provides a list of private game feature components that a customer has created for the customer's own private use. Line 316 specifies a ListPubliclyAvailableGFCs call that provides a list of publicly available game feature components. Line 317 specifies a CreateGFC call that allows a customer to create a game feature component and assign an identifier to the game feature component. Line 318 specifies a DeleteGFC call that allows a customer to delete a game feature component having the specified identifier. Line 319 specifies a PutGFCEvent call, which may be called by a game feature component in order to issue an event notification to the event bus 101. The PutGFCEvent call has parameters GFCId, busName and event.

Line 320 is a heading that indicates that the next indented tier of bullets (which includes lines 321-324) relate to actions that may be called for a game feature component. Line 321 specifies a CreateGFCAction call, which allows an action to be created for a game feature component. The CreateGFCAction call has parameters GFCid, actionName, and config. GFCid is identifier for the game feature component for which the action is being created. The actionName parameter is a name for the action. And the config parameter allows a configuration for the action to be specified. Line 322 specifies a ListGFCActions call, which provides a list of created actions for an identified game feature component. Line 323 specifies a DeleteGFCAction call, which allows an identified action (identified via the actionName parameter) to be deleted from an identified game feature component (identified via the GFCid parameter). Line 324 specifies an UpdateGFCAction call that allows a configuration of an identified action for an identified game feature component to be updated.

Line 325 is a heading that indicates that the next indented tier of bullets (which includes lines 326-329) relate to events for which a game feature component may send notifications to the event bus 101. Line 326 specifies a CreateGFCEvent call, which allows an event to be created for a game feature component. The CreateGFCEvent call has parameters GFCid, eventName, and config. GFCid is an identifier for the game feature component for which the event is being created. The eventName parameter is a name for the event. And the config parameter allows a configuration for the event to be specified. Line 327 specifies a ListGFCEvents call, which provides a list of created events for an identified game feature component. Line 328 specifies a DeleteGFCEvent call, which allows an identified event (identified via the eventName parameter) to be deleted from an identified game feature component (identified via the GFCid parameter). Line 329 specifies an UpdateGFCEvent call that allows a configuration of an identified event for an identified game feature component to be updated.

Figure 4:
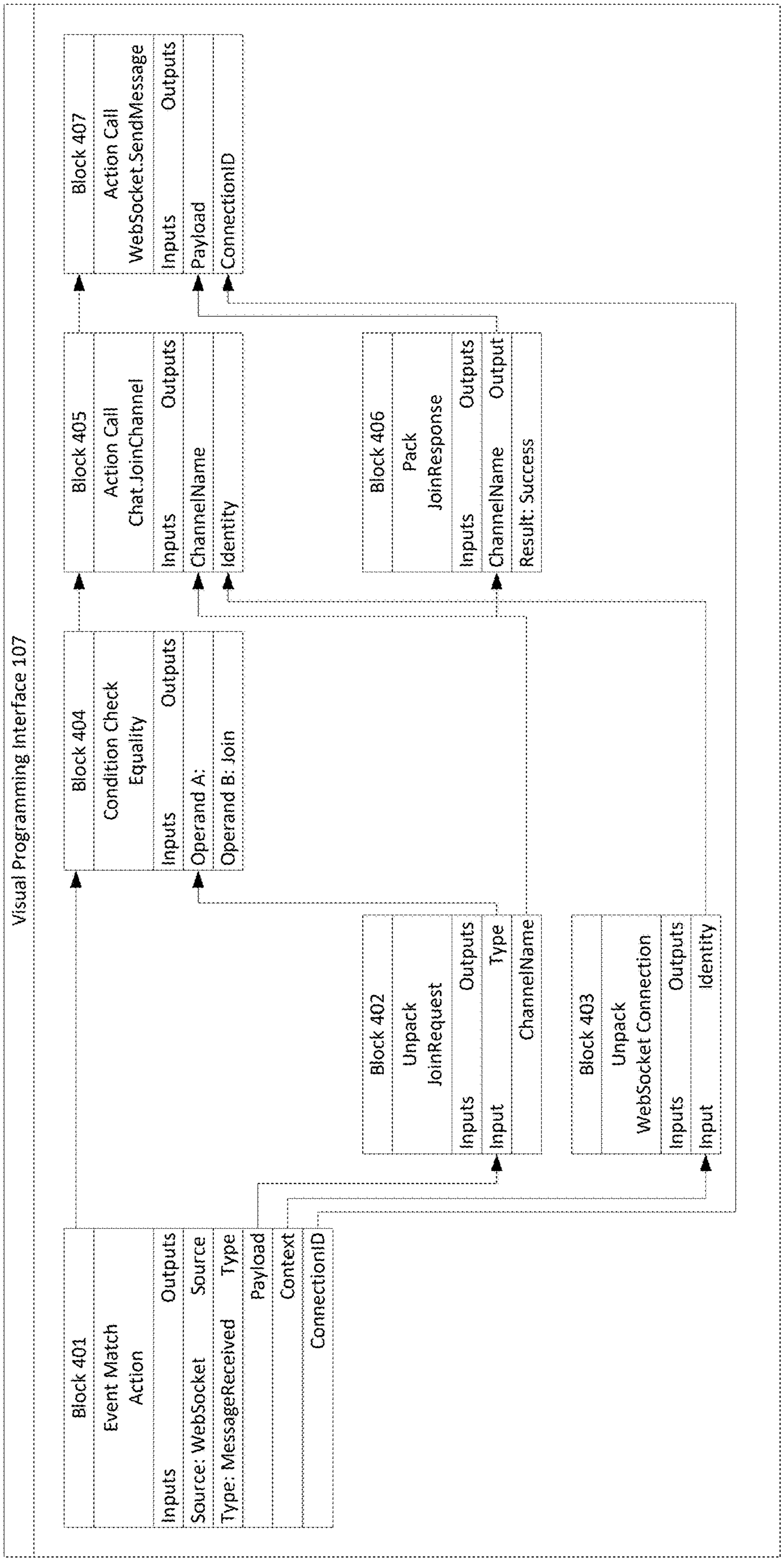
FIG. 4 is a diagram illustrating an example visual programming interface for defining a rule flow that may be used in accordance with the present disclosure.

Referring now to FIG. 4, an example of a visual programming interface 107 for defining a rule flow will now be described in detail. As set forth above with respect to FIG. 1, a customer may create rule flows 103A-N that specify how events are routed and processed by the game feature integration service 100. For example, a rule flow 103A-N may specify one or more actions to be called on one or more game feature components based on a given event. As also described above, the visual programming interface 107 may allow users to visually define a rule flow 103A-N, such as by manipulating graphical representations of operations such as matching of events, calling of actions, and corresponding inputs and outputs. In some cases, the game feature integration service 100 may then generate an underlying data representation (e.g., via JSON) of the rule flow 103A-N based on the graphical relationships defined by the customer within the visual programming interface 107. It is noted that the visual programming interface 107 is merely one example manner in which rule flows may be defined, and that other techniques may be employed.

In the example of FIG. 4, a user has employed visual programming interface 107 to graphically define a rule flow 103A-N for a MessageReceived event corresponding to receipt of a join message for a user requesting to join a chat channel. The rule flow 103A-N calls actions to notify a chat game feature component (e.g., chat component 211D of FIG. 2) that the user is requesting to join a chat channel and to report an acknowledgement of the user successfully joining the chat channel. As shown, the visual programming interface 107 displays blocks 401-404, which represent operations associated with the rule flow 103A-N. It is noted that the visual programming interface 107 may allow blocks 401-404 (and optionally other graphical components) and their contents to be created, deleted, and manipulated, for example by connecting inputs and outputs of blocks 401-404.

In this example, block 401 represents matching of an event for which an event notification is received. Block 401 indicates that the event notification will be received from a source that is the websocket game feature component (e.g., player connector 211A of FIG. 2). Block 401 also indicates that the event type will be a MeesageReceived event. Thus, block 401 indicates that the rule flow 103A-N being defined may be applied when a MessageReceived event notification is received from the websocket game feature component. Block 402 represents an unpack operation that unpacks the payload of the MessageReceived event. Specifically, block 402 provides the type of the MessageReceived event, which is a Join type, to block 404. This means that the received message is a join message corresponding to a user requesting to join a chat channel. Block 402 also provides a channel name to blocks 405 and 406. The channel name is the name of the channel that the user is requesting to join. Block 403 represents another unpack operation that unpacks the context of the MessageReceived event. In this example, the context of the event is the joining user's identity (e.g., a user ID). Block 403 provides the joining user's identity to block 405.

Block 404 is a condition check that checks whether the payload of the MessageReceived event is equivalent to Join (meaning that the received message is a join message corresponding to a user requesting to join a chat channel). If the received message is a join message, then the flow proceeds to block 405. Block 405 is an action call block that calls an action on a chat game feature component (e.g., chat component 211D of FIG. 2) to cause processing of a join request from the identified user to join the chat channel having the channel name identified in the join request.

Blocks 406 and 407 correspond to returning an acknowledgment of the user successfully joining the chat channel. Specifically, block 406 represents a pack operation that indicates that block 407 will be performed when the user successfully joins the chat channel having the channel name identified in the join request. Block 407 is an action call block that calls an action on a websocket game feature component (e.g., e.g., player connector 211A of FIG. 2). In this example, the action includes sending an acknowledgement message to the websocket game feature component that the user has successfully joined the chat channel having the channel name identified in the join request.

Figure 5:
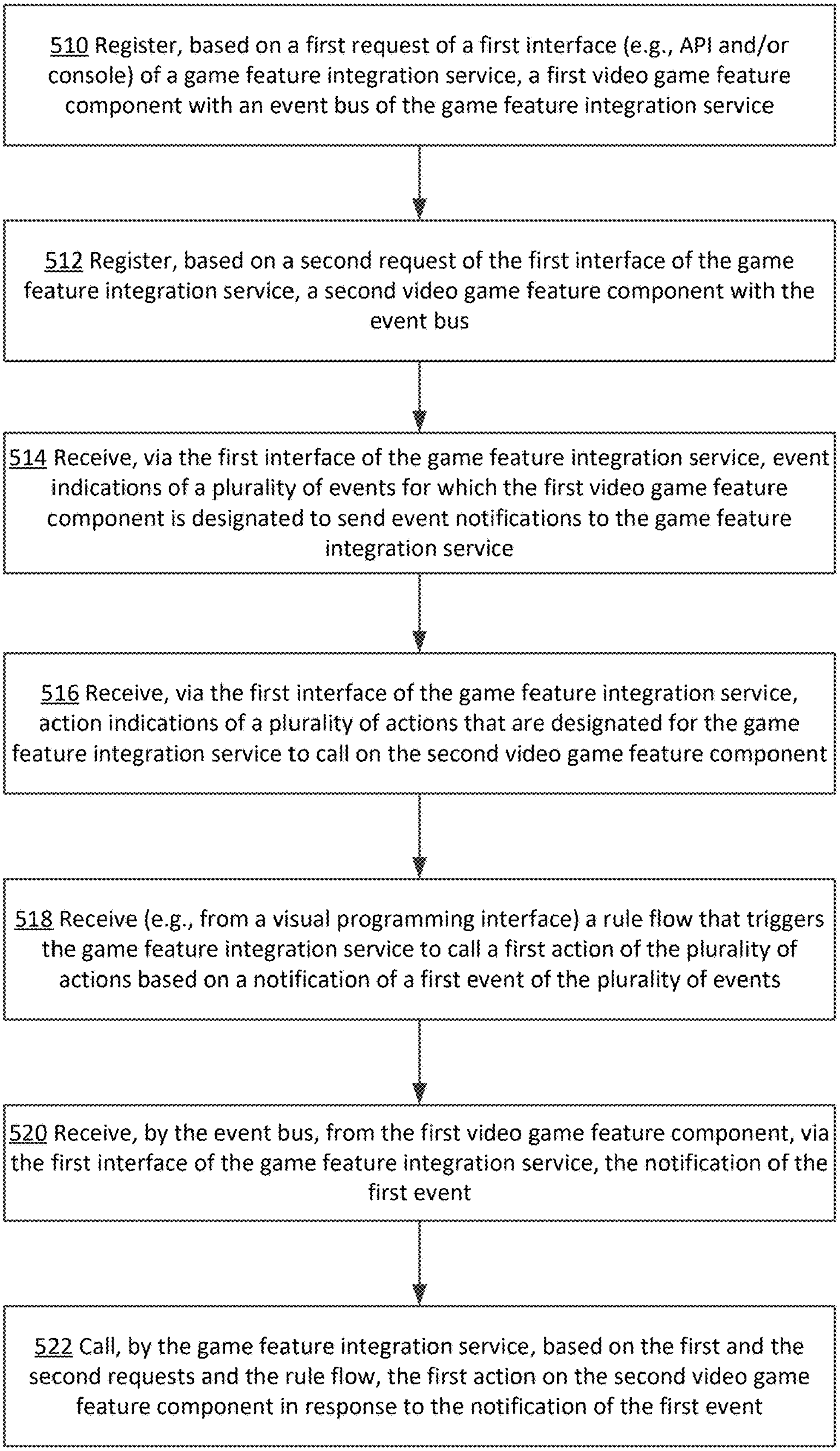
FIG. 5 is a flowchart illustrating an example game feature component integration process that may be used in accordance with the present disclosure.

FIG. 5 is a flowchart illustrating an example game feature component integration process that may be used in accordance with the present disclosure. In some examples, any, or all, of operations 510-522 of FIG. 5 may be performed by a game feature integration service. At operation 510, a first video game feature component is registered, based on a first request of a first interface of a game feature integration service, with an event bus of the game feature integration service. The first interface referred to in FIG. 5 may be, for example, an API of the game feature integration service (e.g., API 104 of FIG. 1), a user interface (e.g., console interface) of the game feature integration service (e.g., user interface 105 of FIG. 1), or any combination of these or other interface features provided by the game feature integration service. In some examples, the first request to register the first video game feature component may be made using the CreateBusAttachment call described above with reference to FIG. 3. Line 303 of the API schema 300 specifies a CreateBusAttachment call that allows an attachment (game feature component) to be registered with (e.g., attached to) the event bus 101. The CreateBusAttachment call has parameters busName, GFCId, and config. The busName is the name of the bus to which the game feature component is being attached. The GFCId is an identifier for the game feature component being attached. The config parameter represents configuration information regarding the game feature component that is associated with the event bus to which the game feature component is being attached. The game feature integration service may register the first video game feature component with the event bus by storing a data association between the first video game feature component and the event bus, such as by adding the first video game feature component to a stored list of game feature components that are registered with the event bus. In some examples, the first video game feature component may perform one or more authentication features, one or more matchmaking features, one or more player connection features, one or more game server connection features, or one or more chat features.

At operation 512, a second video game feature component is registered, based on a second request of the first interface of the game feature integration service, with the event bus. In some examples, the second request to register the second video game feature component may also be made using the CreateBusAttachment call described above with reference to FIG. 3. The game feature integration service may register the second video game feature component with the event bus by storing a data association between the second video game feature component and the event bus, such as by adding the second game feature component to a stored list of video game feature components that are registered with the event bus. In some examples, the second video game feature component may perform one or more authentication features, one or more matchmaking features, one or more player connection features, one or more game server connection features, or one or more chat features. Also, in some examples, the game feature integration service may provide a catalog of available video game feature components (e.g., feature component catalog 106 of FIGS. 1-2) from which at least one of the first video game feature component or the second video game feature component are selected. As described above, in some examples, the first video game feature component may be executed by a first hosting topology, and the second video game feature component is executed by a second hosting topology that is different from the first hosting topology. As also described above, in some examples, the first video game feature component may be created by a first entity, and the second video game feature component is created by a second entity that is different from the first entity.

At operation 514, event indications are received, via the first interface of the game feature integration service, of a plurality of events for which the first video game feature component is designated to send event notifications to the game feature integration service. In some examples, the event indications may be CreateGFCEvent calls that may be received by the game feature integration service. For example, as described above with reference to FIG. 3, line 326 of the API schema 300 specifies a CreateGFCEvent call, which allows an event to be created for a game feature component. The CreateGFCEvent call has parameters GFCid, eventName, and config. GFCid is an identifier for the game feature component for which the event is being created (e.g., the first video game feature component). The eventName parameter is a name for the event. And the config parameter allows a configuration for the event to be specified. As should be appreciated, actions may also be created for the first video game feature component, for example, via CreateGFCAction calls specified at line 321 of FIG. 3.

At operation 516, action indications are received, via the first interface of the game feature integration service, of a plurality of actions that are designated for the game feature integration service to call on the second video game feature component. In some examples, the action indications may be CreateGFCAction calls that may be received by the game feature integration service. For example, as described above with reference to FIG. 3, line 321 of the API schema 300 specifies a CreateGFCAction call, which allows an action to be created for a game feature component. The CreateGFCAction call has parameters GFCid, actionName, and config. GFCid is identifier for the game feature component for which the action is being created (e.g., the second video game feature component). The actionName parameter is a name for the action. And the config parameter allows a configuration for the action to be specified. As should be appreciated, events may also be created for the second video game feature component, for example, via CreateGFCEvent calls specified at line 326 of FIG. 3.

At operation 518, a rule flow is received that triggers the game feature integration service to call a first action of the plurality of actions based on a notification of a first event of the plurality of events. In one specific example described above with reference to FIG. 4, a rule flow may specify that, in response to an event notification indicating that a user is requesting to join a chat channel, an action will be called to cause processing of a join request from the identified user to join the chat channel having the channel name identified in the join request. Additionally, the rule flow may also specify that another action will be called to report an acknowledgement of the user successfully joining the chat channel. As also described above with reference to FIG. 4, in some examples, the rule flow may be received from a visual programming interface 107 that allows creation of the rule flow using graphical elements (e.g., blocks 401-404). The graphical elements in the visual programming interface may represent operations such as event matching (e.g., block 401) and action calling (e.g., blocks 405-407). Blocks 401-404 are described in detail above with reference to FIG. 4, and this description is not repeated here. The rule flow may also be received from a variety of other programmatic or other interfaces. As described above, in some examples, the rule flow may be a custom rule flow created by the customer or a pre-configured rule flow created by another party.

At operation 520, the notification of the first event is received, by the event bus, via the first interface of the game feature integration service. In some examples, the notification of the first event may be provided by the first video game feature component, for example by issuing the PutGFCEvent call shown at line 319 of API schema 300 of FIG. 3. As described above, the PutGFCEvent call may be called by a game feature component (e.g., the first video game feature component) in order to issue an event notification to the event bus 101. The PutGFCEvent call has parameters GFCId, busName and event. In this example, the GFCId may be the identifier of the video game feature component that is issuing the event notification (e.g., the first video game feature component). The busName may be the name of the event bus to which the notification is sent. The event parameter may include the name of the first event for which the event notification is sent.

At operation 522, the game feature integration service calls, based on the first and the second requests and the rule flow, the first action on the second video game feature component in response to the notification of the first event. As described above with reference to FIG. 1, upon receipt of an event notification 121A-D by the event bus 101, the orchestration engine 102 may evaluate rule flow collection 103 to determine one or more of the rule flows 103A-N that are applicable to the corresponding event. The orchestration engine 102 may then determine one or more of the rule flows 103A-N that are applicable and perform one or more of the action calls 122A-D that may be indicated by the one or more of the rule flows 103A-N. For example, game feature component 111A may provide a notification of a given event, and a rule flow 103A-N may indicate an action to be called on game feature component 111B based on the event, and optionally based on one or more parameters associated with the event. For example, as described above with reference to FIG. 4, a MessageReceived event notification may be received from a player connector (e.g., websocket) component and may indicate that a user is requesting to join a chat channel. The orchestration engine may then match this event notification to a rule flow that provides rules for responding to event notifications for MessageReceived events from the player connector (e.g., websocket) component that have a type of join and specify a chat channel name. As described above, the rule flow may include a rule that triggers the game feature integration service to call an action on a chat component to cause processing of a join request from the identified user to join the chat channel having the channel name identified in the join request. Another example related to authentication is described above with reference to FIG. 2, in which a rule flow may include a rule that specifies that if a message received event notification has a message type=log-in, then an action will be triggered to route the message to the authenticator 211C and request that the authenticator 211C verify an authentication token. The rule may specify that, if the token is valid, the authenticator 211C will return a player ID. The rule may further specify that, if the token is invalid, the authenticator 211C will return a message indicating that the token is invalid.

In some examples, upon receipt of the event notification by the event bus, the game feature integration service may confirm that the game feature component that sent the event notification (e.g., the first video game feature component) is registered with the event bus. This may provide security by ensuring that non-registered components cannot make unauthorized calls to the event bus. Also, in some examples, when calling the first action on the second video game feature component, the game feature integration service may employ an action call that is defined, via the API, for a registered game feature component (e.g., the second video game feature component). For these and other reasons, the calling of the first action may be performed based at least in part on the first and the second requests and the rule flow.

Figure 6:
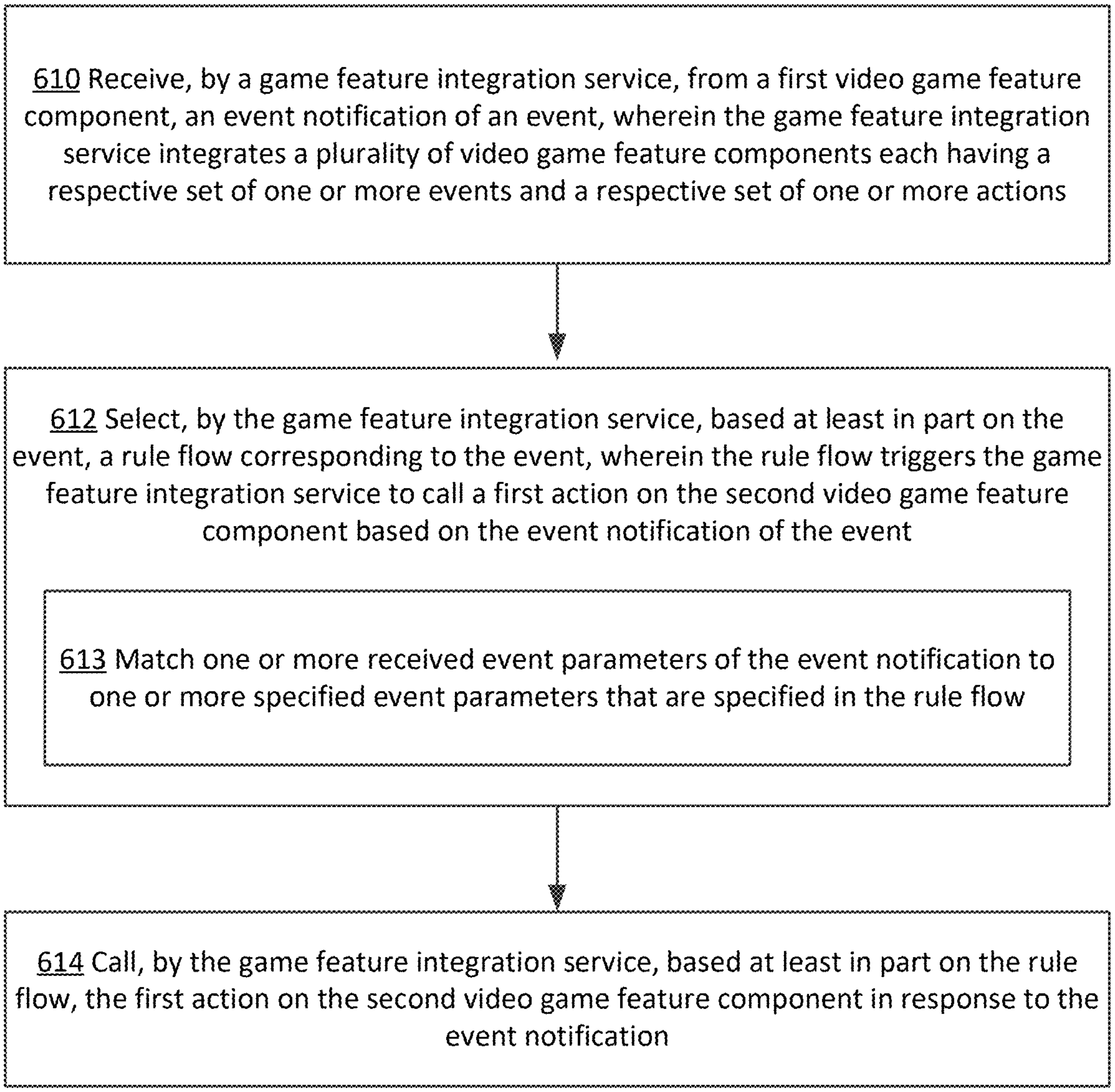
FIG. 6 is a flowchart illustrating an example process for game feature component event processing that may be used in accordance with the present disclosure.

FIG. 6 is a flowchart illustrating an example process for game feature component event processing that may be used in accordance with the present disclosure. In some examples, any, or all, of operations 610-614 of FIG. 6 (including sub-operation 613) may be performed by a game feature integration service. At operation 610, an event notification of an event is received, by a game feature integration service, from a first video game feature component, wherein the game feature integration service integrates a plurality of video game feature components each having a respective set of one or more events and a respective set of one or more actions. In some examples, the notification of the event may be provided by the first video game feature component, for example by issuing the PutGFCEvent call shown at line 319 of API schema 300 of FIG. 3. As described above, the PutGFCEvent call may be called by a game feature component (e.g., the first video game feature component) in order to issue an event notification to the event bus 101. The PutGFCEvent call has parameters GFCId, busName and event. In this example, the GFCId may be the identifier of the video game feature component that is issuing the event notification (e.g., the first video game feature component). The busName may be the name of the event bus to which the notification is sent. The event parameter may include the name of the first event for which the event notification is sent.

The plurality of video game feature components that are integrated by the game feature integration service may include the first video game feature component and a second video game feature component. In some examples, the first video game feature component may perform one or more authentication features, one or more matchmaking features, one or more player connection features, one or more game server connection features, or one or more chat features. Also, in some examples, the second video game feature component may perform one or more authentication features, one or more matchmaking features, one or more player connection features, one or more game server connection features, or one or more chat features.

The plurality of video game feature components that are integrated by the game feature integration service may be host-independent and creator-independent. In some examples, the first video game feature component may be executed by a first hosting topology, and the second video game feature component is executed by a second hosting topology that is different from the first hosting topology. Also, in some examples, the first video game feature component may be created by a first entity, and the second video game feature component is created by a second entity that is different from the first entity. As described above with reference to FIG. 1, a game feature integration service 100 integrates game feature components 111A-D that are host-independent and creator-independent. As described above, the term host-independent, as used herein, refers to game feature components 111A-D that may be integrated by the game feature integration service 100 irrespective of the host topologies 151A-D that are used to host the game feature components 111A-D. This means that the game feature integration service 100 may integrate game feature components 111A-D hosted on any number of different host topologies 151A-D. In the example of FIG. 1, game feature component 111A is hosted by host topology 151A, which may be, for example, a developer's personal computer (e.g., laptop, desktop etc.). Game feature component 111B is hosted by host topology 151B, which may be, for example, a customer's on-premises data center. Game feature component 111C is hosted by host topology 151C, which may be, for example, a first cloud service provider. Game feature component 111D is hosted by host topology 151D, which may be, for example, a second cloud service provider. As also described above, the term creator-independent, as used herein, refers to game feature components 111A-D that may be integrated by the game feature integration service 100 irrespective of the creators of the game feature components 111A-D. This means that the game feature integration service 100 may integrate game feature components 111A-D created by any number of different creators 152A-D. In the example of FIG. 1, game feature component 111A is created by creator 152A, which may be, for example, a customer of the game feature integration service 100. Game feature component 111B is created by creator 152B, which may be, for example, a third-party developer. Game feature component 111C is created by creator 152C, which may be, for example, a first cloud service provider. Game feature component 111D is created by creator 152D, which may be, for example, a second cloud service provider.

Each of the plurality of video game feature components that are integrated by the game feature integration service may have a respective set of one or more events for which event notifications are sent by a corresponding video game feature component to the game feature integration service. In the example of FIG. 1, game feature components 111A-D send event notifications 121A-D, respectively. The event notifications 121A-D are notifications of game-related events. The event notifications 121A-D are received by the game feature integration service 100 via the event bus 101. As described above, in some examples, one or more requests defining the respective set of one or more events for each of the plurality of video game feature components may be received, via one or more API calls of the game feature integration service.

Each of the plurality of video game feature components that are integrated by the game feature integration service may have a respective set of one or more actions that are called on the corresponding video game feature component by the game feature integration service. In the example of FIG. 1, action calls 122A-D are performed by game feature integration service 100 on game feature components 111A-D, respectively. As described above, in some examples, one or more requests defining the respective set of one or more actions for each of the plurality of video game feature components may be received, via one or more API calls of the game feature integration service.

At operation 612, a rule flow corresponding to the event is selected, by the game feature integration service, based at least in part on the event, wherein the rule flow triggers the game feature integration service to call a first action on the second video game feature component based on the event notification of the event. The rule flow may be selected from a plurality of rule flows provided to the game feature integration service. The rule flow may specify an action chain in which a second action is performed based on an output of the first action. In one specific example described above with reference to FIG. 4, a rule flow may specify that, in response to an event notification indicating that a user is requesting to join a chat channel, an action will be called to cause processing of a join request from the identified user to join the chat channel having the channel name identified in the join request. Additionally, the rule flow may also specify that another action will be called to report an acknowledgement of the user successfully joining the chat channel. As also described above with reference to FIG. 4, in some examples, a visual programming interface 107 may be provided that allows creation of the rule flow using graphical elements (e.g., blocks 401-404). The graphical elements in the visual programming interface may represent operations such as event matching (e.g., block 401) and action calling (e.g., blocks 405-407). Blocks 401-404 are described in detail above with reference to FIG. 4, and this description is not repeated here. The rule flow may also be received from a variety of other programmatic or other interfaces. As described above, in some examples, the rule flow may be a custom rule flow created by the customer or a pre-configured rule flow created by another party.

Operation 612 may include sub-operation 613, at which one or more one or more received event parameters of the event notification are matched to one or more specified event parameters that are specified in the rule flow. Event parameters are parameters associated with an event, such as a source of the event notification (e.g., the game feature component that issued the event notification), a type and/or sub-type the of event, context information, and other information associated with the event. For example, as described above with reference to FIG. 4, a MessageReceived event notification may be received from a player connector (e.g., websocket) component and may indicate that a user is requesting to join a chat channel. The orchestration engine may then match this event notification to a rule flow that provides rules for responding to event notifications for MessageReceived events from the player connector (e.g., websocket) component that have a type of join and specify a chat channel name.

At operation 614, the first action on the second video game feature component is called, by the game feature integration service, based at least in part on the rule flow, in response to the event notification. As described above with reference to FIG. 1, upon receipt of an event notification 121A-D by the event bus 101, the orchestration engine 102 may evaluate rule flow collection 103 to determine one or more of the rule flows 103A-N that are applicable to the corresponding event. The orchestration engine 102 may then determine one of or more of the rule flows 103A-N that are applicable and perform one or more of the action calls 122A-D that may be indicated by the one or more of the rule flows 103A-N. For example, game feature component 111A may provide a notification of a given event, and a rule flow 103A-N may indicate an action to be called on game feature component 111B based on the event, and optionally based on one or more parameters associated with the event. FIG. 4 describes an example in which a MessageReceived event notification may be received from a player connector (e.g., websocket) component and may indicate that a user is requesting to join a chat channel. A rule flow may include a rule that triggers the game feature integration service to call an action on a chat component to cause processing of the join request from the identified user to join the chat channel having the channel name identified in the join request. Another example related to authentication is described above with reference to FIG. 2, in which a rule flow may include a rule that specifies that if a message received event notification has a message type=log-in, then an action will be triggered to route the message to the authenticator 211C and request that the authenticator 211C verify an authentication token. The rule may specify that, if the token is valid, the authenticator 211C will return a player ID. The rule may further specify that, if the token is invalid, the authenticator 211C will return a message indicating that the token is invalid.

Figure 7:
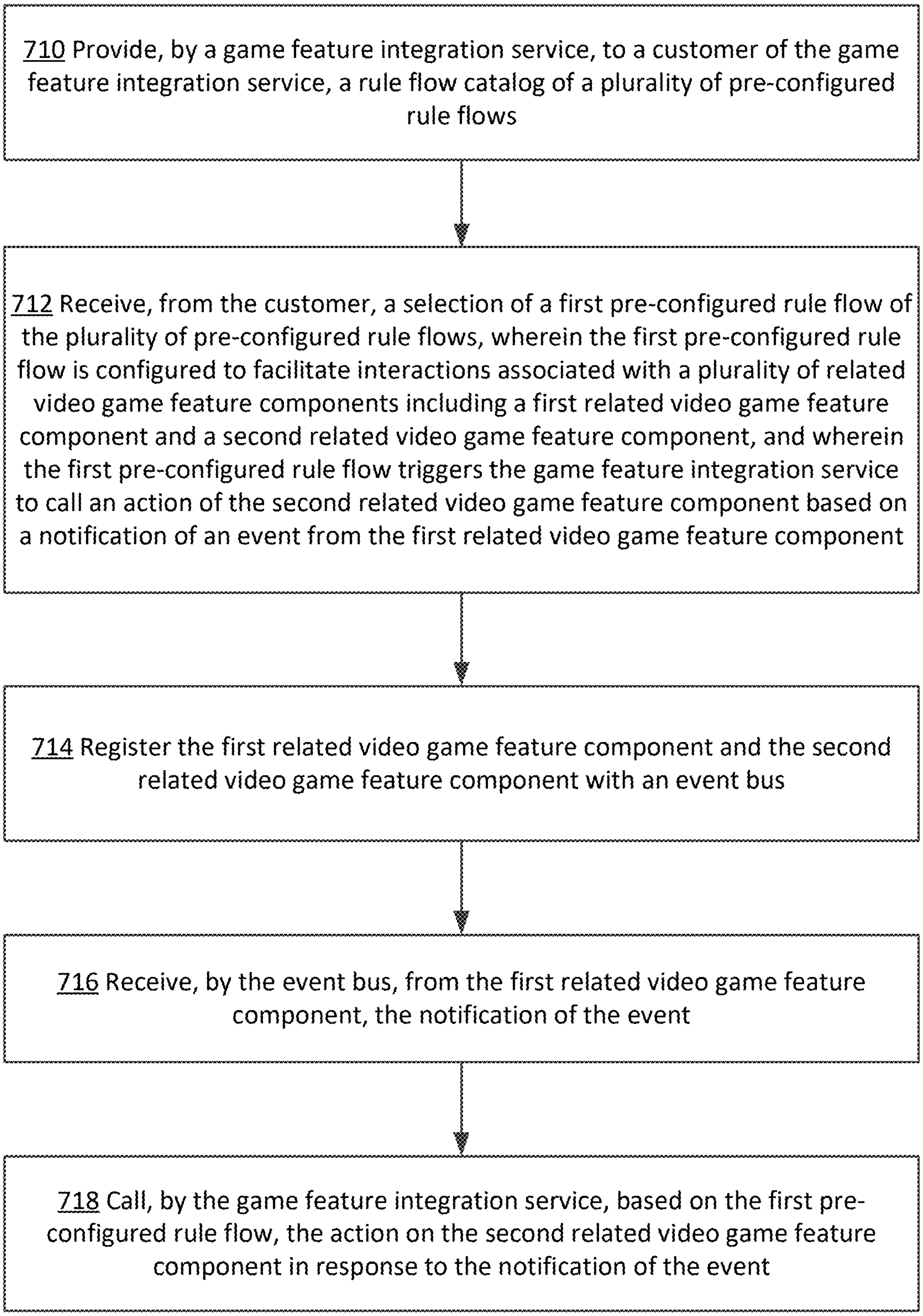
FIG. 7 is a flowchart illustrating an example process for game feature integration using a pre-configured rule flow that may be used in accordance with the present disclosure.

FIG. 7 is a flowchart illustrating an example process for game feature integration using a pre-configured rule flow that may be used in accordance with the present disclosure. In some examples, any, or all, of operations 710-718 of FIG. 7 may be performed by a game feature integration service. At operation 710, a rule flow catalog of a plurality of pre-configured rule flows is provided, by a game feature integration service, to a customer of the game feature integration service. In the example of FIG. 1, the game feature integration service 100 provides a pre-configured rule flow catalog 109, which may indicate one or more pre-configured rule flows that are available for selection and use by the customer 140. The pre-configured rule flow catalog 109 may provide an identification of each available pre-configured rule flow and a description of the pre-configured rule flow, for example indicating a general purpose of the pre-configured rule flow (e.g., authentication, matchmaking, leaderboards and achievements, chat and communications, etc.) as well as an indication of related game feature components which the pre-configured rule flow is designed, or otherwise configured, to interact. The pre-configured rule flow catalog 109 may be provided via a user interface 105, such as a console, webpage, client application or other interface.

At operation 712, a selection of a first pre-configured rule flow of the plurality of pre-configured rule flows is received from the customer, wherein the first pre-configured rule flow is configured to facilitate interactions among, or otherwise associated with, a plurality of related video game feature components including a first related video game feature component and a second related video game feature component, and wherein the first pre-configured rule flow triggers the game feature integration service to call an action of the second related video game feature component based on a notification of an event from the first related video game feature component. The customer may select the first pre-configured rule flow for use by the customer, such as for attachment to, and use by, a respective event bus and/or orchestration engine provided by the game feature integration service and associated with the customer. In some examples, the plurality of related video game feature components may be identified, in the rule flow catalog, as being related to the first pre-configured rule flow. Also, in some examples, the first pre-configured rule flow may specify an action chain in which an additional action is performed based on an output of the action of the second related video game feature component. In some examples, the first related video game feature component may be executed by a first hosting topology, and the second related video game feature component may be executed by a second hosting topology that is different from the first hosting topology. Also, in some examples, the first related video game feature component may be created by a first entity, and the second related video game feature component may be created by a second entity that is different from the first entity. In some examples, the first and/or the second related video game feature component may perform one or more authentication features, one or more matchmaking features, one or more player connection features, one or more game server connection features, one or more chat features and/or a wide variety of other video game features.

At operation 714, the first related video game feature component and the second related video game feature component are registered with an event bus. In some examples, as a convenience to the customer, when the customer selects the first pre-configured rule flow, the game feature integration service may automatically register (e.g., attach) the first related video game feature component and the second related video game feature component (as well as any other video game feature components in the plurality of related video game feature components) to the event bus 101 based on the selection of the first pre-configured rule flow without the need for specific attachment instructions from the customer. Additionally, in some examples, in addition to automatically registering the first and the second related video game feature components, the game feature integration service may also automatically import lists, or other indications, of defined actions and events for the first and the second related video game feature components. By contrast, in some examples, a selection of the first related video game feature component and the second related video game feature component from the plurality of related feature video game components for registration to the event bus may be received from the customer. For example, as described above, the related game feature components for a pre-configured rule flow may be indicated to the customer 140 (e.g., via the pre-configured rule flow catalog 109), and the customer 140 may select which of the related game feature components the customer 140 wishes to attach to the event bus 101. For example, in some cases, a customer 140 may choose from multiple alternative related game feature components that may be used with the pre-configured rule flow—or the customer 140 may instead choose to substitute their own custom-made game feature component (or another third-party game feature component) for one or more of the related game feature components.

At operation 716, the notification of the event is received, by the event bus, from the first related video game feature component. In some examples, the notification of the event may be provided by the first related video game feature component, for example by issuing the PutGFCEvent call shown at line 319 of API schema 300 of FIG. 3. As described above, the PutGFCEvent call may be called by a game feature component (e.g., the first related video game feature component) in order to issue an event notification to the event bus 101. The PutGFCEvent call has parameters GFCId, busName and event. In this example, the GFCId may be the identifier of the video game feature component that is issuing the event notification (e.g., the first related video game feature component). The busName may be the name of the event bus to which the notification is sent. The event parameter may include the name of the first event for which the event notification is sent.

At operation 718, the action on the second related video game feature component is called, by the game feature integration service, based on the first pre-configured rule flow, in response to the notification of the event. As described above with reference to FIG. 1, upon receipt of an event notification 121A-D by the event bus 101, the orchestration engine 102 may evaluate rule flow collection 103 to determine one or more of the rule flows 103A-N that are applicable to the corresponding event. The orchestration engine 102 may then determine one or more of the rule flows 103A-N that are applicable and perform one or more of the action calls 122A-D that may be indicated by the one or more of the rule flows 103A-N(e.g., the first pre-configured rule flow). For example, game feature component 111A may provide a notification of a given event, and a rule flow 103A-N(e.g., the first pre-configured rule flow) may indicate an action to be called on game feature component 111B based on the event, and optionally based on one or more parameters associated with the event. FIG. 4 describes an example in which a MessageReceived event notification may be received from a player connector (e.g., websocket) component and may indicate that a user is requesting to join a chat channel. A rule flow (e.g., the first pre-configured rule flow) may include a rule that triggers the game feature integration service to call an action on a chat component to cause processing of the join request from the identified user to join the chat channel having the channel name identified in the join request. Another example related to authentication is described above with reference to FIG. 2, in which a rule flow (e.g., the first pre-configured rule flow) may include a rule that specifies that if a message received event notification has a message type=log-in, then an action will be triggered to route the message to the authenticator 211C and request that the authenticator 211C verify an authentication token. The rule may specify that, if the token is valid, the authenticator 211C will return a player ID. The rule may further specify that, if the token is invalid, the authenticator 211C will return a message indicating that the token is invalid.

The example use-cases described above with reference to FIGS. 1-7 relate to scenarios in which the feature integration techniques described herein are applied to video games. It is noted, however, that the techniques described herein may also be applied to a wide variety of use-cases that are not video game related or that are only partially video game related. Thus, it is noted that a feature integration service may be substituted for any reference made in the above description to a game feature integration service. A feature integration service may operate in a similar manner as the game feature integration service described above, with the exception that the feature integration service need not necessarily be directed to video game use-cases. It is also noted that a feature component may be substituted for any reference made in the above description to a game feature component (or video game feature component). A feature integration service may integrate a plurality of feature components that are host-independent and creator-independent without the need to create custom integration code. A feature component may operate in a similar manner as the game feature components (or video game feature components) described above, with the exception that the feature component need not necessarily be directed to video game use-cases. A feature component is a software computing component that executes respective instructions for reporting respective defined events and performing respective defined actions that the feature component may be called to perform. Additionally, a feature component may define data that specifies structure and validation techniques for inputs to, and outputs from, the respective defined actions.

Some example use-cases that are not video game-related (or that are only partially video game-related) will now be described. In some examples, the techniques described herein may be employed in environments for processing assets, such as artwork, video, audio, metadata and the like. In asset processing environments, assets may be stored, retrieved, modified and transformed based on a variety of asset processing feature components that may be linked together by orchestration engine 102. Each asset processing feature component may be host-independent and creator-independent as described above. Also, in some examples, the techniques described herein may be employed in event-based analytics environments. In some of these event-based analytics environments, events may be created on a real-time basis, and the event may be ingested, filtered, processed, transformed and egressed to an appropriate location for further action by a service. In yet other examples, the techniques described herein may be employed for gamification of a consumer experience. For example, some consumer products, such as treadmills and exercise bikes, may be incorporated with video game-related features for real or simulated exercise classes, such as a game-like application that models a racetrack for a simulated bike race and that encourages a person using an exercise bike to compete in the simulated bike race against other humans and/or computer simulated bike users. In these gamified consumer products, integrated feature components may perform features associated with leaderboards, user achievements and matchmaking for classes, and the like.

In yet other examples, the techniques described herein may be employed in message posting and other social-media systems, for example to integrate feature components that perform tasks such as message posting, notifications of when messages are posted, responded-to, etc., sentiment analysis per message, upvoting and downvoting (e.g., likes and dislikes), and the like. In yet other examples, the techniques described herein may be employed in collaboration systems, for example to integrate feature components that perform tasks related to coordinating communication between users of a document during collaborative editing. In yet other examples, the techniques described herein may be employed in polling and survey systems, such as those that are combined with gaming and other content streaming services. For example, the techniques described herein may be used to integrate feature components that perform tasks such as posting of a timed poll/survey (e.g., in which people who have voted can see the updates to the results in real-time) and tying those results into behavior changes to a game or other media that is streamed.

In yet other examples, the techniques described herein may be employed as a coordination system for peer-to-peer server clusters. For example, servers may connect to a server connector feature component, and the server connector may post messages to an event bus when servers connect and disconnect. Additionally, in some examples, a cluster feature component may store a list of active servers, updating it when servers connect and disconnect. Servers may query the cluster feature component for information regarding other available servers. In some examples, the techniques described herein may be employed as a coordination system for a collection (e.g., fleet) of game servers that may be executed on any of a variety of different host topologies. For example, game servers may connect to a server connector feature component, which may post messages to an event bus when servers connect and disconnect. Additionally, a server collection/fleet feature component may store a list of active servers, updating it when servers connect and disconnect. Also, in some examples, game session assignment requests may be events that are posted to the event bus, and the event bus may choose an available game server to host the game session by calling the server collection/fleet feature component and responding back with the address of the chosen game server. In some examples, the game client may, or may not, be attached to the event bus, depending on how the customer performs the integration. Furthermore, in some examples, servers can send a "heartbeat" message to maintain status, and the server may be queried via the server feature component to ask for status, metrics and the like.

In yet other examples, the techniques described herein may be employed in mapping applications, for example to integrate feature components that perform tasks such as providing traffic updates, route routing and re-route suggestions, hazards indications and the like. It some examples, the techniques described herein may be employed in a wide variety of interactive applications in which several parties (e.g., users, servers, etc.) concurrently interact with an application, and some of those parties will be notified of what the other parties are doing.

Figure 8:
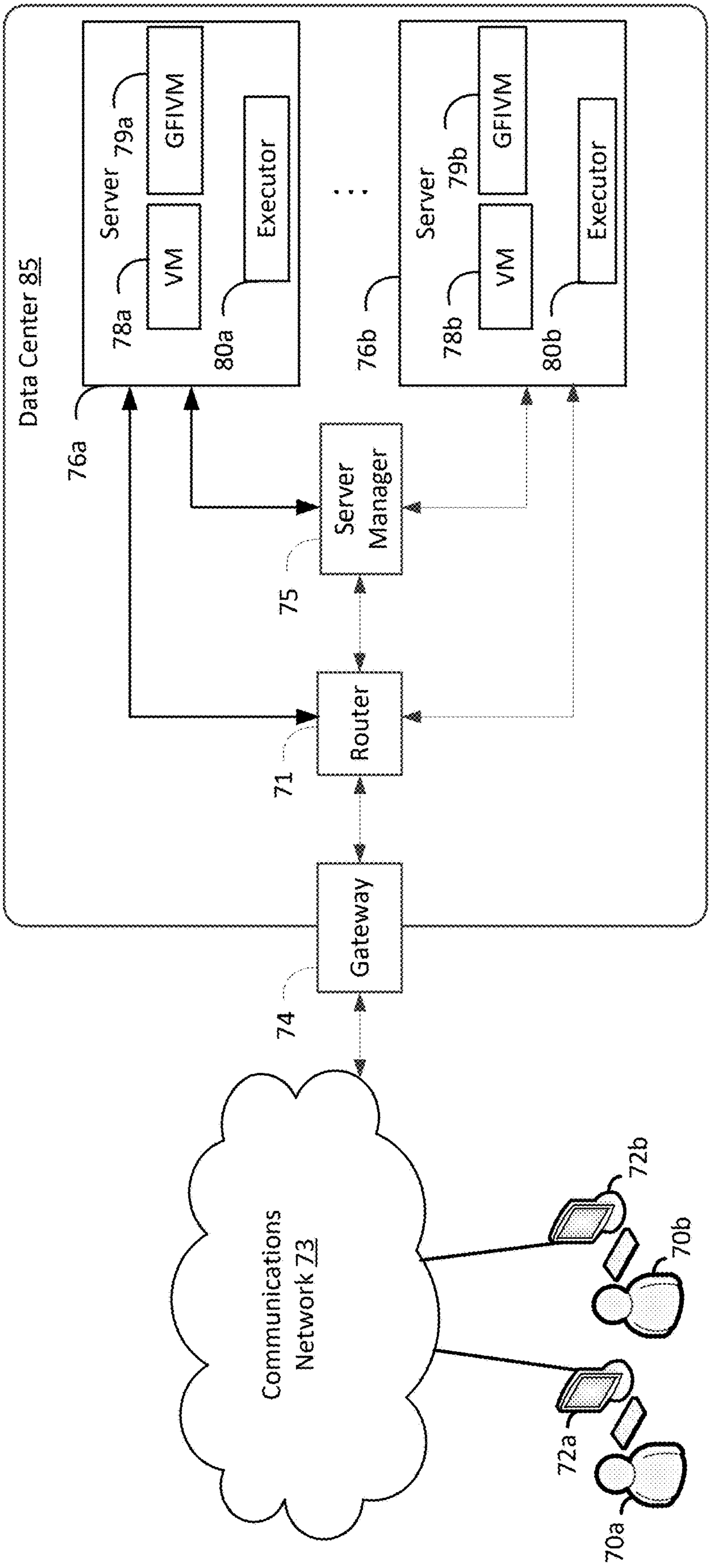
FIG. 8 is a diagram illustrating an example system for transmitting and providing data that may be used in accordance with the present disclosure.

An example system for transmitting and providing data will now be described in detail. In particular, FIG. 8 illustrates an example computing environment in which the embodiments described herein may be implemented. FIG. 8 is a diagram schematically illustrating an example of a data center 85 that can provide computing resources to users 70*a* and 70*b* (which may be referred herein singularly as user 70 or in the plural as users 70) via user computers 72*a* and 72*b* (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76*a* and 76*b* (which may be referred herein singularly as server 76 or in the plural as servers 76) that provide computing resources. These resources may be available as bare metal resources or as virtual machine instances 78*a*-*b* (which may be referred herein singularly as virtual machine instance 78 or in the plural as virtual machine instances 78). In this example, the resources also include game feature integration virtual machines (GFIVM's) 79*a*-*b*, which are virtual machines that are configured to execute any, or all, of the game feature integration techniques described above.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 8, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72*a* or 72*b* may be a server, a desktop or laptop personal computer, a tablet computer, a wireless telephone, a personal digital assistant (PDA), an e-book reader, a game console, a set-top box or any other computing device capable of accessing data center 85. User computer 72*a* or 72*b* may connect directly to the Internet (e.g., via a cable modem or a Digital Subscriber Line (DSL)). Although only two user computers 72*a* and 72*b* are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 8 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80*a* or 80*b* (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 8, a router 71 may be utilized to interconnect the servers 76*a* and 76*b*. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 8, a server manager 75 is also employed to at least in part direct various communications to, from and/or between servers 76*a* and 76*b*. While FIG. 8 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 8 has been greatly simplified and that many more networks and networking devices may be utilized to interconnect the various computing systems disclosed herein. These network topologies and devices should be apparent to those skilled in the art.

It should also be appreciated that data center 85 described in FIG. 8 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 9:
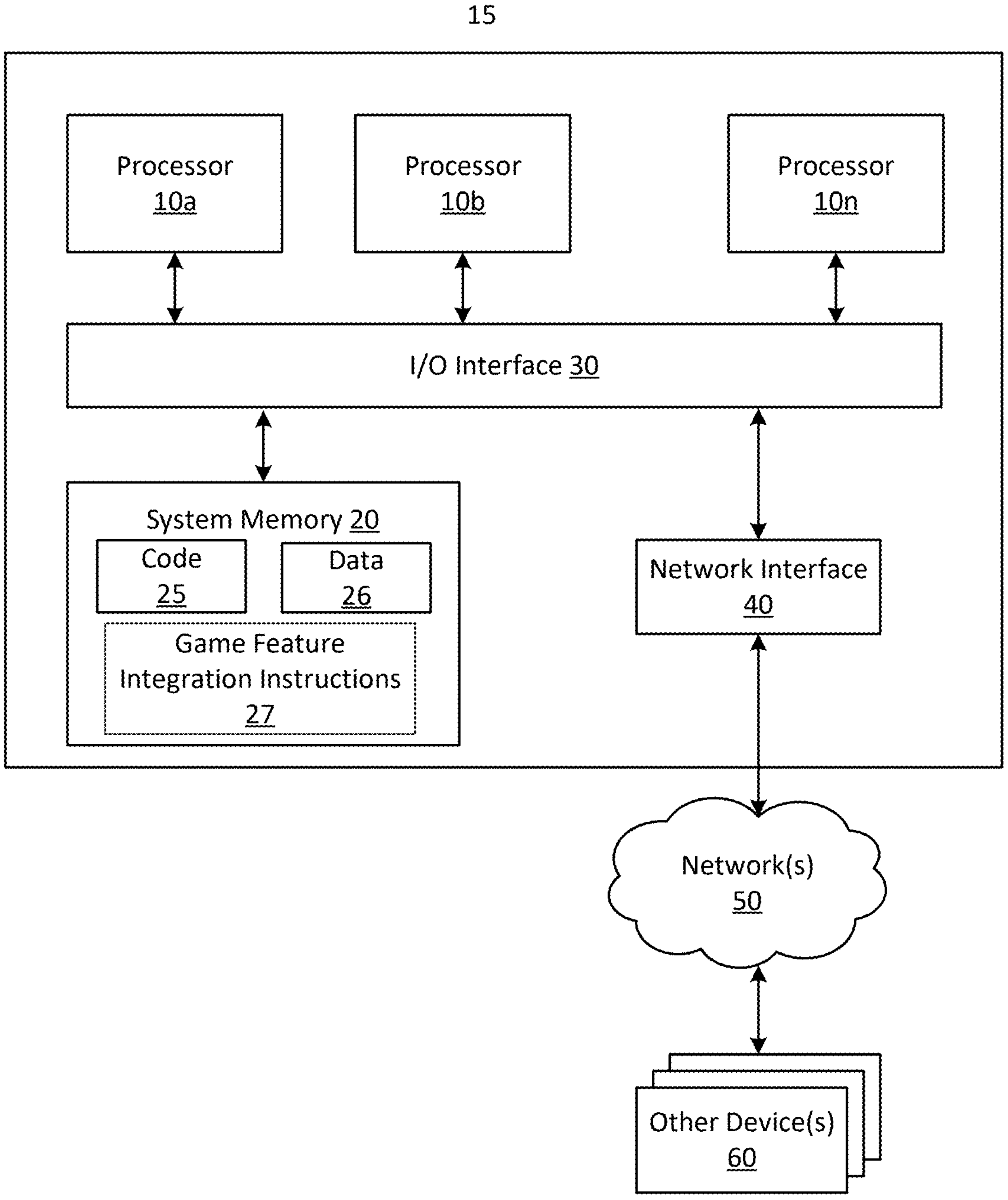
FIG. 9 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 9 depicts a computer system that includes or is configured to access one or more computer-accessible media. In the illustrated embodiment, computing device 15 includes one or more processors 10*a*, 10*b* and/or 10*n* (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26. Additionally, in this example, system memory 20 includes game feature integration instructions 27, which are instructions for executing any, or all, of the game feature integration techniques described above.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability container of a resource instance is intended to be independent of the availability container of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:

one or more processors; and one or more memories having stored therein instructions that, upon execution by the one or more processors, cause the computing system to perform computing operations comprising:

providing, by a game feature integration service, a visual programming interface that is employed to define a rule flow corresponding to an event by allowing user manipulation of a plurality of graphical elements corresponding to a plurality of operations, wherein the game feature integration service integrates a plurality of video game feature components that are host-independent and creator-independent, wherein the plurality of video game feature components includes a first video game feature component and a second video game feature component, wherein each of the plurality of video game feature components has a respective set of one or more events for which event notifications are sent by a corresponding video game feature component to the game feature integration service and a respective set of one or more actions that are called on the corresponding video game feature component by the game feature integration service, and wherein the rule flow triggers the game feature integration service to call a first action on the second video game feature component based on an event notification of the event;

receiving, by the game feature integration service, from the first video game feature component, the event notification of the event;

selecting, by the game feature integration service, based at least in part on the event, the rule flow corresponding to the event, wherein the rule flow is selected from a plurality of rule flows provided to the game feature integration service and calling, by the game feature integration service, based at least in part on the rule flow, the first action on the second video game feature component in response to the event notification.

2. The computing system of claim 1, wherein the selecting of the rule flow comprises matching one or more received event parameters of the event notification to one or more specified event parameters that are specified in the rule flow.

3. The computing system of claim 1, wherein the operations further comprise:

providing, by the game feature integration service, a centralized reporting interface from which performance metrics for each of the plurality of video game feature components are obtainable.

4. A computer-implemented method comprising:

providing, by a feature integration service, a visual programming interface that is employed to define a rule flow corresponding to an event by allowing user manipulation of a plurality of graphical elements corresponding to a plurality of operations, wherein the feature integration service integrates a plurality of feature components that are host-independent, wherein the plurality of feature components includes a first feature component and a second feature component, wherein each of the plurality of feature components has a respective set of one or more events for which event notifications are sent by a corresponding feature component to the feature integration service and a respective set of one or more actions that are called on the corresponding feature component by the feature integration service, and wherein the rule flow triggers the feature integration service to call a first action on the second feature component based on an event notification of the event;

receiving, by the feature integration service, from the first feature component, the event notification of the event;

selecting, by the feature integration service, based at least in part on the event, the rule flow corresponding to the event, wherein the rule flow is selected from a plurality of rule flows provided to the feature integration service; and calling, by the feature integration service, based at least in part on the rule flow, the first action on the second feature component in response to the event notification.

5. The computer-implemented method of claim 4, wherein the selecting of the rule flow comprises matching one or more received event parameters of the event notification to one or more specified event parameters that are specified in the rule flow.

6. The computer-implemented method of claim 4, further comprising:

providing, by the feature integration service, a centralized reporting interface from which performance metrics for each of the plurality of feature components are obtainable.

7. The computer-implemented method of claim 4, wherein the graphical elements in the visual programming interface represent at least one of event matching or action calling.

8. The computer-implemented method of claim 4, wherein the rule flow specifies an action chain in which a second action is performed based on an output of the first action.

9. The computer-implemented method of claim 4, wherein the first feature component performs one or more authentication features, one or more matchmaking features, one or more player connection features, one or more game server connection features, or one or more chat features.

10. The computer-implemented method of claim 4, wherein the first feature component is executed by a first hosting topology, and wherein the second feature component is executed by a second hosting topology that is different from the first hosting topology.

11. The computer-implemented method of claim 4, wherein the first feature component is created by a first entity, and wherein the second feature component is created by a second entity that is different from the first entity.

12. One or more non-transitory computer-readable storage media having stored thereon computing instructions that, upon execution by one or more computing devices, cause the one or more computing devices to perform computing operations comprising:

providing, by a feature integration service, a visual programming interface that is employed to define a rule flow corresponding to an event by allowing user manipulation of a plurality of graphical elements corresponding to a plurality of operations, wherein the feature integration service integrates a plurality of feature components that are host-independent, wherein the plurality of feature components includes a first feature component and a second feature component, wherein each of the plurality of feature components has a respective set of one or more events for which event notifications are sent by a corresponding feature component to the feature integration service and a respective set of one or more actions that are called on the corresponding feature component by the feature integration service, and wherein the rule flow triggers the feature integration service to call a first action on the second feature component based on an event notification of the event;

receiving, by the feature integration service, from the first feature component, the event notification of the event;

selecting, by the feature integration service, based at least in part on the event, the rule flow corresponding to the event, wherein the rule flow is selected from a plurality of rule flows provided to the feature integration service; and calling, by the feature integration service, based at least in part on the rule flow, the first action on the second feature component in response to the event notification.

13. The one or more non-transitory computer-readable storage media of claim 12, wherein the selecting of the rule flow comprises matching one or more received event parameters of the event notification to one or more specified event parameters that are specified in the rule flow.

14. The one or more non-transitory computer-readable storage media of claim 12, wherein the operations further comprise:

providing, by the feature integration service, a centralized reporting interface from which performance metrics for each of the plurality of feature components are obtainable.

15. The one or more non-transitory computer-readable storage media of claim 12, wherein the graphical elements in the visual programming interface represent at least one of event matching or action calling.

16. The one or more non-transitory computer-readable storage media of claim 12, wherein the rule flow specifies an action chain in which a second action is performed based on an output of the first action.

17. The one or more non-transitory computer-readable storage media of claim 12, wherein the first feature component performs one or more authentication features, one or more matchmaking features, one or more player connection features, one or more game server connection features, or one or more chat features.

* * * * *